United States Patent [19]
Revell

[11] B 3,985,528
[45] Oct. 12, 1976

[54] CONTROL MEANS AND AUTOMATIC ROLL-TYPE FILTER
[75] Inventor: Alan E. Revell, Louisville, Ky.
[73] Assignee: American Air Filter Company, Inc., Louisville, Ky.
[22] Filed: Jan. 24, 1975
[21] Appl. No.: 543,941
[44] Published under the second Trial Voluntary Protest Program on January 13, 1976 as document No. B 543,941.

Related U.S. Application Data
[63] Continuation-in-part of Ser. No. 376,672, July 5, 1973, abandoned.

[52] U.S. Cl. ................................................. 55/352
[51] Int. Cl.² ........................................ B01D 46/18
[58] Field of Search ............... 55/352, 274, DIG. 34

[56] References Cited
UNITED STATES PATENTS
3,324,633  6/1967  Revell .................................... 55/354

Primary Examiner—Bernard Nozick
Attorney, Agent, or Firm—Jon C. Winger

[57] ABSTRACT

A control circuit for an automatic roll-type air filter including a photocell for detecting the dust load condition of the filter media and for energizing the circuit to cause the filter media to advance in response to the dust loading, a variable resistor to provide adjustment of the set-point at which the circuit is energized, and a fixed value resistor in series with the variable resistor to prevent setting of the variable resistor to a value which would allow the circuit to be energized thereby advancing the filter media when cleaned media is present in the air filter zone of the automatic roll-type air filter.

3 Claims, 5 Drawing Figures

CONTROL MEANS AND AUTOMATIC ROLL-TYPE FILTER

CROSS REFERENCE TO RELATED APPLICATIONS

The present invention is a continuation-in-part of co-pending application, U.S. Ser. No. 376,672, filed on July 5, 1973 by Alan E. Revell and Dan L. Scott now abandoned.

BACKGROUND OF THE INVENTION

One method of controlling the advance of the air filter curtain in an automatic roll-type air filter is to sense the variations in the static pressure on opposite sides of the filter curtain, with a high pressure differential indicating a heavily dust laden media thereby requiring advancement of clean media into the filtering zone. Another known method of controlling the advance of air filter media into the air stream is to advance increments of filter curtain at predetermined intervals with the predetermination of the intervals being based upon an estimated rate at which the filter curtain will capture contaminants and dust from the air stream. When employing the latter method, it becomes apparent that if the estimate of contaminant capture is reasonably accurate, the use efficiency of the filter media will generally be high. However, if the dust concentration in the air varies over a wide range, this method is very inefficient and very uneconomical. Other known methods of advancing a filter media curtain include combinations employing both a static pressure differential variation detector and a time measuring apparatus in an attempt to gain the best of the two above-mentioned methods.

The present invention, however, is concerned with still another method of controlling the advance of a filter curtain in roll-type air filters. This method features the underlying concept that variations in the light transmitting character of a filter curtain, which passes light, may be used as the basis upon which to make a determination of the need for advancing additional clean filter curtain into the air stream. The principal underlying this concept is that the light transmitting character of the filter curtain will vary within limits in accordance with the quantity of contaminants or dirt caught by the filter curtain. More specifically, the principal is that the greater the amount of dirt captured by the filter curtain, the greater the reduction in light transmission through the curtain and, conversely, the less dirt captured, the less reduction in light transmission. Thus, the present invention provides a straightforward, inexpensive, readily constructed and easily maintained control circuit for automatic roll-type air filters which provides a photocell for detecting the variations in the light transmitting character of the filter curtain, means for preselecting a set-point at which the filter media curtain will advance in response to dust loading, and fail-safe means for preventing the advancement of the filter media curtain when clean filter media is present in the filtering zone of the roll-type air filter.

SUMMARY OF THE INVENTION

The present invention provides an air filtering apparatus including a filter media supply roll to receive a roll of filter media, a filter take-up roll to receive filter media from the supply roll, an air filtering zone disposed between the supply roll and the take-up roll, and filter media extending from the media supply roll through the air filtering zone to the filter media take-up roll, so air to be treated passes through the filter media in the air filter zone, an adjustable fail-safe air filter media advance control system responses to a reduction in the light transmitting quality of the media, the filter media advance control system comprising:

an electric light source of controlled intensity disposed on one side of the filter media, and a photocell disposed on the opposite side of the filter media from the light source;

an electric motor drivingly connected to the take-up roll to effect the advance of the media;

an energizing circuit to energize the motor to drive the take-up roll, the energizing circuit including normally open first switch means, normally open second switch means, and normally open third switch means, the first, second and third switch means and the motor being in series;

the first switch means being operable to a closed position in response to an increase in resistance in the energizing circuit caused by the quantity of light received by the photocell falling below a first predetermined value, the second switch means being operable to a closed position in response to energization of the light source, and the third switch means being operable to a closed position in response to an increase in resistance in the energizing circuit caused by the quantity of light received by the photocell falling below a second predetermined value, the second predetermined value being higher than the first predetermined value, wherein the motor is energized when the first, second and third switch means are each in a closed position;

a rheostat enabling a resistance value to be preselected which when exceeded by the resistance of the photocell initiates activation of the first switch means and energizes the motor to drive the take-up roll;

a resistor in series with the rheostat, the resistor being of sufficient value to prevent the rheostat from being adjusted to such a low resistance value that the first switch means is activated to advance the media when clean media is present in the air filtering zone;

fourth switch means operable to a closed position energizing a warning lamp in response to the supply of media being depleted to a predetermined level.

The invention of this disclosure has been found to be a reliable and efficient method for providing the advancement of clean filter media in roll-type filters where the dust load of the gas to be filtered varies over a wide range.

DESCRIPTION OF THE DRAWINGS

A better understanding of the present invention will be had upon reference to the accompanying drawings wherein like numerals refer to like parts throughout the several views and in which.

DESCRIPTION OF THE PREFERRED EMBODIMENT

Figure 1:
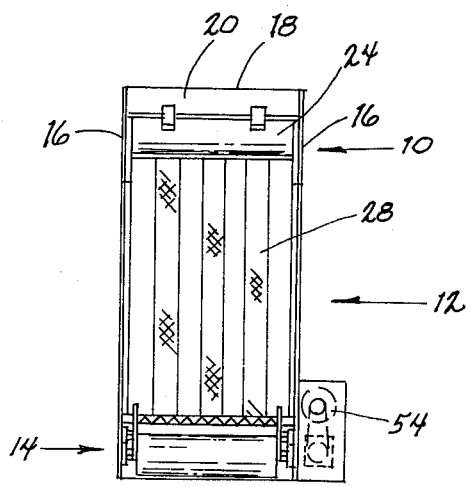
FIG. 1 is a front elevational view of a commercially available automatic roll-type air filter employing a glass fiber filter media.
Figure 2:
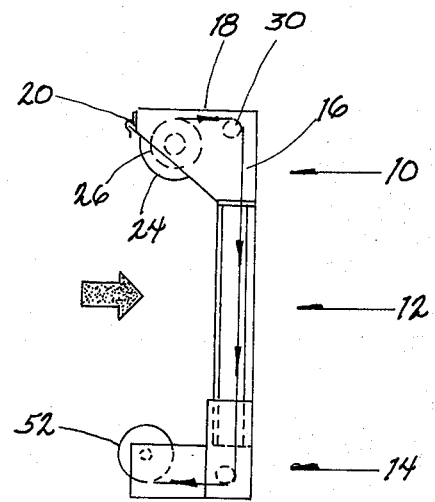
FIG. 2 is a side view of the air filter of FIG. 1 with the path of the filter media advance being from a supply zone zoo an air flow zone to a discharge zone.

Referring first to FIGS. 1 and 2, the automatic roll-type air filter to which the present invention pertains generally comprises a supply zone 10, an air flow zone 12 through which the filter media is advanced in its operatively expanded condition, and a discharge zone 14 into which the varied filter material is fed for winding into a roll for disposal. Air flow through the filter apparatus is in a front-to-rear direction as indicated by the mottled arrow in FIG. 2.

The supply zone (see FIG. 1) is formed by a pair of generally triangular-shaped sidewall portions 16, a top wall 18, a front wall 20, a stub rear wall 22, and a semi-cylindrical trough-shaped front cover 24 pivotally supported along its lower rear edge by the side walls adapted to receive a supply spool 26 of filter material which is carried therewithin nesting relationship. The supply spool has a supply of filter material 28 tightly wound thereupon, the spool being disposed within the cover so that when the filter media is advanced it passes from the upper side of the spool over a fluted idler roller 30 which extends transversely across a supply zone and is spaced slightly below the top wall. The roller is mounted so that it rotates as the filter media is advanced around it and down into the air flow zone.

As the filter media passes around the idler roller 30, it advances into the air flow zone 12 through a generally rectangular entry aperture 32 defined along the rear by the downwardly-directed lower edge of the stub rear wall 22, along the front by the roller 30, and at the sides by upper ends of inwardly-open edge seal channels 34 which receive the vertical edges of the filter media as the filter media enters the air flow zone.

The dirtied filter material exits the air flow zone 12 by passing through an exit aperture 58 defined between the rear surface of an idler reel 50 and a rear wall 48. It then passes forwardly over a pressure plate 59 to the core of the rewind spool 52 where it is wound upon the core in a compressed condition.

The advance of the filter media into, through and out of the air stream is effected by energizing a motor 54 to cause rotation of the rewind spool 52. Energization of the motor is controlled in accordance with the detected light transmitting quality of the filter media curtain 28 in a selected area in the air stream to be cleaned. To measure this light transmitting quality, a light source 60 and light detecting means 62 are provided in the upper part of the air flow zone adjacent the entry aperture 32 through which the filter material is advanced into the air stream to be cleaned.

Figure 3:
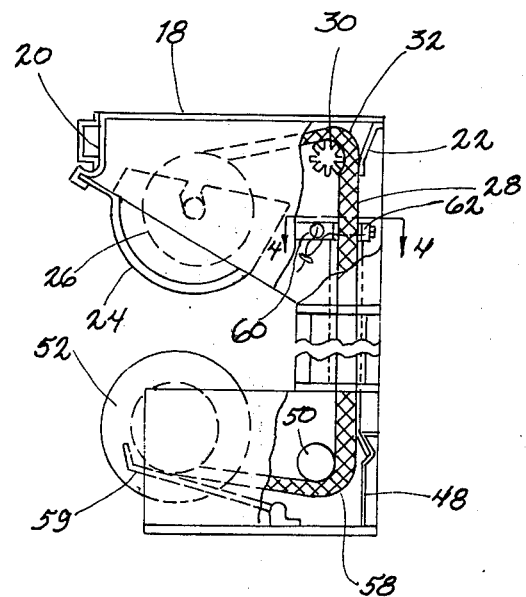
FIG. 3 is a partially broken side view illustrating certain details of an air filter incorporating the invention.
Figure 4:
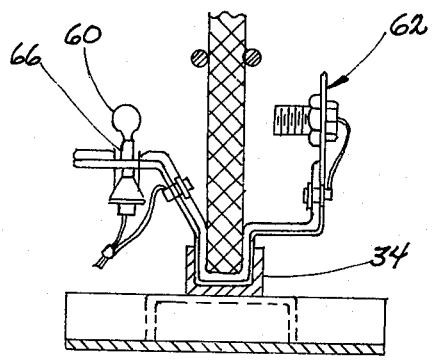
FIG. 4 is a fragmentary, horizontal sectional view corresponding to one taken along line 4—4 of FIG. 3.

Referring now to the upper part of FIG. 3 and to FIG. 4, the light source 60 as presently preferred takes the form of a 28 volt lamp such as is commercially available from the Chicago Miniture Corp. as number CM308. Advantageously, the light may be located within a transparent shield in the form of a glass globe (not shown) which can be mounted on a socket fixture 66 which holds the lamp. However, such shield is not necessary and should be considered an optional item.

The light detecting means 62 is preferably located on the downstream side of the filter curtain and generally opposite the light source located on the upstream side of the filter curtain, as shown in FIGS. 3 and 4. Detecting means 62 takes the form of a photocell preferably of the cadimium sulfide type. Such photocells are commercially available from, for example, the Vactec Corp. with any of the 500 series being suitable. Specifically, a Vactec VT 521 photocell may be used. An example of a presently preferred control circuit incorporating the light source and light detecting means is shown in FIG. 5.

The lines 78 and 80 are connected to a source of electrical power through power switches and fuses as shown. A completed circuit energizing the rewind spool drive motor 54 results when the switch 82 of a resistant sensitive amplifier 83 closes due to energization of its associated control relay coil 84. The switch 82 of the control relay 83 is normally held open so that the drive motor 54 for the air filter is normally de-energized and the filter curtain is stationary. A normally open switch 86 is provided to permit manual energization of the drive motor for loading and unloading purposes.

Figure 5:
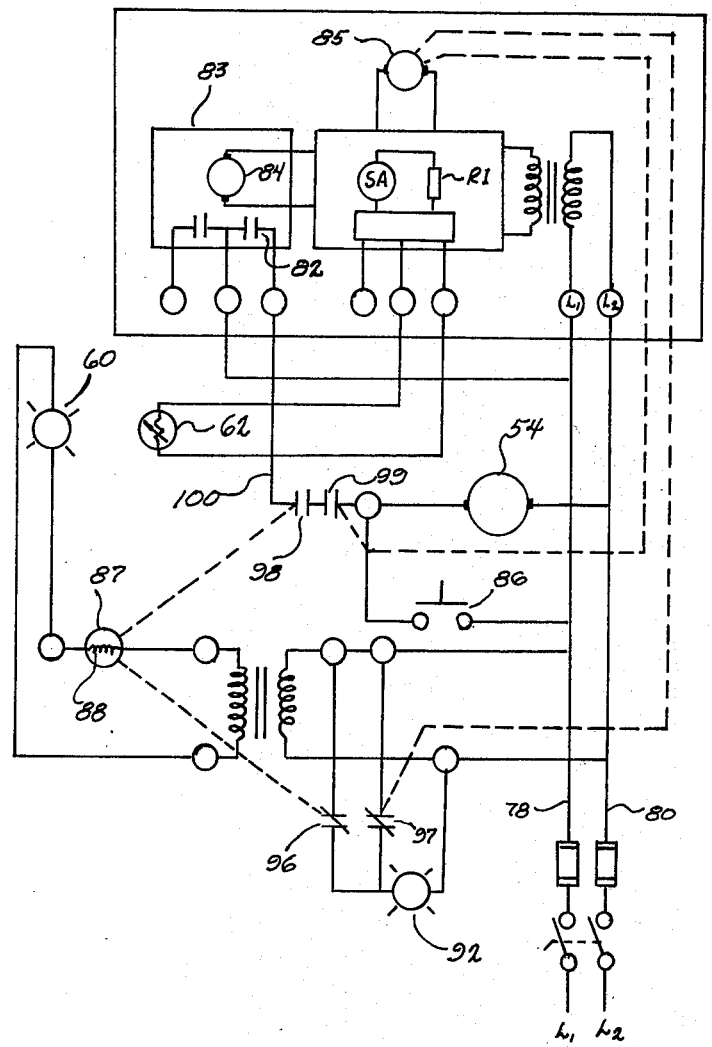
FIG. 5 is an electrical circuit diagram of the present invention.

The other principal elements shown in the control circuit of FIG. 5 comprise the lamp 60, the light detecting means generally designated 62, a current sensitive relay generally designated 87, and a warning lamp 92. The current sensitive relay 87 includes a coil 88 in series with the lamp 60, and two single pole, single throw switches 96 (normally closed) and 98 (normally opened) controlled in accordance with current flow through the coil 88. While current flows through the coil 88, the switch 96 in series with the warning lamp 92 is maintained in an open position and the switch 98 in series with the drive motor 54 is maintained in a closed position. The switch 98 is connected in series through line 100 with the switch 82 of the resistance sensitive amplifier 83. Switch 82 is maintained in an open position in response to a level of light received by the photoelectric relay equaling or exceeding a first predetermined value and operates to a closed position upon a reduction of such light below that value. The control circuit also comprises a variable resistor SA in series with a fixed resistor R1. The variable resistor SA and fixed resistor R1 can be considered to be in series with the photocell 62. Preferably, the maximum resistance of the variable resistor SA is on the order of 10 times greater than the resistance of the fixed resistor R1. The reason for this resistance ratio of approximately 10 to 1 between the variable resistor SA and the fixed resistor R1 will become evident in the description of the operation hereafter explained. In practice, it has been determined that a variable resistor having a maximum resistance of 25 ohms and fixed resistance of 2.7 ohms works well. It is the combined resistance of the variable resistor SA and fixed resistor R1 which established the predetermined value above which the switch 82 will be closed.

The photocell 62 accomplishes the triple function of advancing the filter media, when the supply of media, of de-energizing the motor 54, and activating the warning light 92. The circuitry is illustrated in FIG. 5, for exemplary purposes, as comprising a normally open switch 99 in series with and disposed between the switch 98 and the motor 54, a normally closed switch 97 in parallel with the switch 96 in the warning light portion of the circuit, and a relay coil 85 for controlling the normally open switch 99 and normally closed switch 97 in response to the amount of light received by the photocell 62. The relay coil 85 can be considered to be in series with the fixed resistor R1 and variable resistor SA, and in parallel with the relay 84. The relay 85 requires less voltage to activate than does the relay 84.

A new roll of filter material is installed by mounting the new roll in the supply zone and threading its leading end through the entrance aperture 32 and into the air flow zone, through the exit aperture 58 and around the reel 50 down to the core of the rewind spool 52. The motor 54 is energized by holding the manual switch 86 closed long enough to wind one or two turns of material upon the core of the rewind spool. With clean filter material disposed between the light source 60 and the photocell 62, most of the current flows in that circuit which includes, in series, current sensitive relay coil 88 and the lamp 60. As noted before, with coil 88 energized, switch 96 in the warning circuit assumes an open position, and switch 98 assumes a closed position. However, because the photocell 62 does present some resistance, enough current flows through the relay 85 to activate it to close the switch 99 and open the switch 97, but not enough current flows through the relay 84 for activation, thus, switch 82 remains in the open position and neither the motor 54 or light 92 are energized.

As the filter curtain becomes increasingly dirty due to the build-up of dirt thereon, the light transmitting quality of the filter curtain decreases, thus, resulting in a decrease in the amount of light impinging upon the photocell 62 causing the resistance of the photocell 62 to increase. When the quantity of light transmitted through the filter curtain is reduced to its predetermined level the resistance of the photocell 62 exceeds the resistance through the relay 84, thus, causing enough current to flow through the relay 84 to activate it to close switch 82. When the switch 82 moves to a closed position, the motor 54 is energized advancing the filter media until that portion of the filter curtain advances into a position between the light source 60 and the photocell 62 is sufficiently clean so that the light transmitted to the photoelectric cell 62 lowers the resistance of photocell 62 below the resistance of the relay 84, thus, decreasing the amount of current allowed to flow through the relay 84 and causing the switch 82 to open de-energizing the motor 54.

Because the photocell 62 is unable per se to discriminate between an inadequate light transmission due, on one hand, to a burned out light 60 and on the other hand to a very dirty filter curtain, the current sensitive relay 87 is provided to signal when current ceases to flow through the coil 88 by opening switch 98 and closing switch 96. With switch 98 open, energization of the rewind motor 54 is prevented even when switch 82 is closed in response to the reduction in the quantity of light impinging upon the photocell 62. At the same time switch 98 opens, switch 96 closes to energize the warning light 92.

When the filter material is exhausted from the supply roll, an increasing amount of light from the light source 60 impinges upon the photocell 62 causing the resistance of the photocell 62 to decrease. Thus, all of the current then flows through the photocell 62 in effect shunting the relays 84 and 85. Because the relay 85 is not actuated, the switch 99 opens and the switch 97 closes precluding energization of the motor 54 and energizing the warning lamp 92.

It will be further noted that the light source 60 and the photocell 62 are shown as being disposed relatively close to the entry aperture 32 of the air stream. This is a deliberate positioning and results in relatively small increments of filter material being advanced into the air stream upon energization of the drive motor 54. For purposes of the present apparatus, it may be said that it is preferred that the light source and the light detecting means or photocell be located closer to the entry aperture of the air stream than to the exit aperture. The usefulness of the system is not precluded if the light source and photocell are located relatively close to the exit aperture, but in such a case each time the drive motor is energized it may be expected that almost the entire length of filter curtain in the air stream will be renewed. The renewal of this amount of filter media at one time has not generally been the most advantageous arrangement, and it is difficult, as a practical matter, to avoid this result if the light source and photocell are located near the exit aperture.

Also, it should be noted that the light source is advantageously positioned on the upstream side or servicing side of the filter, thus, a duct light normally provided to light the area for servicing does not interfere with the control. If, in addition to a duct light on the dirty air or servicing side, there is also a duct light on the clean air side there can be provided a light shield in the form of a threaded sleeve which is mounted surroundingly with respect to the photocell to allow only light coming through the filter media to be detected by the photocell.

One filtering material which is widely used in automatic air filters of the type to which this invention is applicable, is a glass fiber web of 2 to 3 inch thickness. A substantial length of this material is, in accordance with disclosure of U.S. Pat. No. 2,807,330, usually applied in the form of a roll having the material in compressed condition on a spool in the supply zone of the filter. The material is passed from the supply zone through an air filtering zone in a resiliently expanded condition, and then is recompressed upon another spool in the discharge zone.

Referring once again to FIG. 5, the signal from the photocell 62 is transmitted to the relay 84 through the fixed value resistance R1 and the variable resistor SA. The relay 84 in turn controls switch 82. Photocell 62 can be considered as a variable resistor whose resistance increases in a darkened environment. Thus, a media which is interposed between the light source 60 and photocell 62 becomes more dust laden, the environment of the photocell 62 becomes darker and the resistance of photocell 62 increases. Only when the resistance of photocell 62 is greater than the combined resistance of resistor R1 and the variable resistor SA, will advance of the media occur. Resistor R1 is preselected having a value of which by itself is large enough so that even in the case when the variable resistor SA is set to zero resistance, the resistance of the photocell 62 when exposed to light through the clean media is smaller than the resistance of R1 and advancement of the media is precluded. Thus, a fail-safe mechanism is provided which prevents an operator from adjusting the variable resistor to a setting which would allow continuous feeding of clean filter media through the automatic roll filter.

It should be noted that the variable resistor SA enables preselection of the point at which the filter media will advance in the automatic roll filter. It, therefore, has particular application where changing uses of the environment served by an automatic roll filter demand different degrees of cleanliness of air. For example, in hospitals employing automatic roll filters to clean the air fed into various rooms, it becomes quite advantageous to be able to adjust the media advance set-point so when the room is being used for a purpose requiring the cleanest possible air the filter media can be advanced more frequently, thus, providing more efficient air filtration. On the other hand, when the room is being used for a purpose which does not require the cleanest air, for example, for storage, the media advance set-point may be adjusted so that media is advanced less frequently to conserve filter media. Such a feature has heretofore not been provided in the circuitry of an automatic roll media filter.

Also, it will be noted that while the current sensitive relay 87 has been described as having a coil 88 and two single pole, single throw switches, a transistor arrangement or any similar switch means could be substituted therefor.

The foregoing detailed description is given primarily for clearness of understanding and no unnecessary limitations should be understood therefrom for modifications will be obvious to those skilled in the art upon reading this disclosure and may be made without departing from the spirit of the invention or the scope of the appended claims.

Having thus described the invention, what is claimed is:

1. An air filtering apparatus comprising: a filter media supply roll to receive a roll of filter media; a filter media take-up roll to receive filter media from said supply roll; an air filtering zone disposed between said supply roll and said take-up roll; filter media extending from said media supply roll through said air filtering zone to said filter media take-up roll, so air can be treated passes through said filter media in said air filter zone; and an adjustable, fail-safe air filter media advanced control system responsive to a reduction in the light transmitting quality of said media, said filter media advanced control system comprising:

an electric light source of controlled intensity disposed on one side of said filter media and electrically connected to a source of electrical energy, and a photocell disposed on the opposite side of said filter media from said light source and connected to a source of electrical energy;

an electric motor drivingly connected to said take-up roll to effect the advance of said media;

an energizing circuit to energize said motor to drive said take-up roll, said energizing circuit including normally open first switch means, normally open second switch means, and normally open third switch means, said first, second and third switch means and said motor being electrically connected in series to a source of electrical energy, and said second switch means being also connected in electrical series to said light source;

a warning light electrically connected to a source of electrical energy;

fourth switch means electrically connected in series with said warning light to the source of electrical energy;

fifth switch means electrically connected to said warning light and parallel to said fourth switch means;

a rheostat electrically connected in series with said photocell and in parallel to said first switch means, said rheostat enables a resistance value to be preselected which when exceeded by the resistance of said photocell initiates activation of said first switch means to energize said motor to drive said take-up roll;

a resistor electrically connected in series with said rheostat and said photocell, said resistor being of sufficient value to prevent said rheostat from being adjusted to such a low resistance value that said first switch means is activated to advance said media when clean media is present in said air filtering zone;

first relay means electrically connected to said first switch means for activating said first switch means, said first relay means being electrically connected to said photocell and parallel with said rheostat and said resistor to close said first switch means when the resistance of said photocell exceeds the resistance of said rheostat due to the quantity of light received by said photocell falling below a first predetermined value;

second relay means electrically connected to said second and fifth switch means for activating said second and fifth switch means, said second relay means being electrically connected in series with said light source to close said second switch means and open said fifth switch means when said light source is energized; and, third relay means electrically connected to said third and fourth switch means, said third relay means being electrically connected to said photocell in series with said rheostat and said resistor and in parallel with said first relay means, said third relay means has less resistance than said first relay means, said third relay means to close said third switch means and open said fourth switch means when the resistance of said photocell exceeds the resistance of said third switch means and is less than the resistance of said rheostat and said resistor due to the quantity of light received by said photocell falling below a second predetermined value, said second predetermined value being higher than said first predetermined value, whereby said motor is energized when said first, second and third switch means are each in a closed position, said warning light is energized and said motor de-energized when said fifth switch means is closed and said second switch means is open indicating the light source is de-energized, and said warning light is energized and said motor de-energized when said fourth switch means is closed and said third switch means is open indicating that the filter media has been exhausted from said air filtering zone.

2. The apparatus of claim 1, wherein said rheostat has a maximum resistance value on the order of ten times the resistance value of said fixed resistor.

3. The apparatus of claim 1, wherein:
the maximum resistance value of said rheostat is on the order of 25 ohms; and
the resistance value of said fixed resistor is on the order of 2.7 ohms.

* * * * *